United States Patent [19]

Stevens et al.

[11] Patent Number: 6,087,447
[45] Date of Patent: Jul. 11, 2000

[54] BLENDS OF SUBSTANTIALLY RANDOM INTERPOLYMERS WITH VINYL OR VINYLIDENE AROMATIC POLYMERS

[75] Inventors: James C. Stevens, Richmond, Tex.; Francis J. Timmers, Midland, Mich.; Martin J. Guest, Lake Jackson, Tex.; John J. Gathers, Pearland, Tex.; Yunwa W. Cheung; Pak-Wing S. Chum, both of Lake Jackson, Tex.; Chung P. Park, Baden-Baden, Germany; George P. Clingerman, Newark, Ohio; Kevin D. Sikkema, Hulst, Netherlands

[73] Assignee: The Dow Chemical Company, Midland, Mich.

[21] Appl. No.: 09/029,442

[22] PCT Filed: Sep. 4, 1996

[86] PCT No.: PCT/US96/14233

§ 371 Date: Mar. 5, 1998

§ 102(e) Date: Mar. 5, 1998

[87] PCT Pub. No.: WO98/10014

PCT Pub. Date: Mar. 12, 1998

Related U.S. Application Data

[60] Continuation-in-part of application No. 08/469,828, Jun. 6, 1995, Pat. No. 5,703,187, which is a division of application No. 07/545,403, Jul. 3, 1990, which is a continuation-in-part of application No. 07/401,345, Aug. 31, 1989, abandoned, application No. 07/428,082, Oct. 27, 1989, abandoned, application No. 07/428,283, Oct. 27, 1989, abandoned, application No. 07/428,276, Oct. 27, 1989, abandoned, and application No. 07/520,168, May 9, 1990, abandoned, which is a continuation of application No. 07/436,524, Nov. 14, 1989, abandoned.

[51] Int. Cl.$^7$ ............................. C08L 25/08; C08L 47/00
[52] U.S. Cl. ........................ 525/211; 525/216; 525/232; 525/241; 521/139
[58] Field of Search .................................. 525/241, 211, 525/216, 232; 521/139

[56] References Cited

U.S. PATENT DOCUMENTS

| | | | |
|---|---|---|---|
| 3,117,945 | 1/1964 | Gorham et al. | 260/45.5 |
| 4,673,711 | 6/1987 | Sharps, Jr. et al. | 525/240 |
| 5,288,762 | 2/1994 | Park et al. | 521/79 |
| 5,340,840 | 8/1994 | Park et al. | 521/60 |
| 5,346,963 | 9/1994 | Hughes et al. | 525/285 |
| 5,460,818 | 10/1995 | Park et al. | 426/415 |

FOREIGN PATENT DOCUMENTS

| | | | |
|---|---|---|---|
| 0 416815 A2 | 3/1991 | European Pat. Off. | C08F 10/00 |
| 0 572990 A2 | 12/1993 | European Pat. Off. | C08F 210/02 |
| 0 739 906 | 10/1996 | European Pat. Off. | C08F 4/80 |
| 7-278230 | 10/1995 | Japan | C08F 210/02 |
| 8-142443 | 6/1996 | Japan | B32B 5/18 |
| 95/03339 | 2/1995 | WIPO | C08F 4/80 |
| 95/32095 | 11/1995 | WIPO | B32B 27/32 |

OTHER PUBLICATIONS

Whelan, "Polymer Technology Dictionary", Chapman & Hall, New York, p. 476 (1994).
"First Technical Details on Some Next–Generation Polyolefins", *Plastics Technology*, Sep. 1992, pp. 25.
Kurt W. Swogger, "Application of Insite* Technology in the Rubber/Elastomer Market", *Worldwide Metallocene Conference Metcon '95*, May 17–19, 1995, Houston, Texas *Trademark of The Dow Chemical Company.
"Dow pairs ethylene styrene", *Plastics News*, Jun. 26, 1995, p. 15.
"Metallocene Catalysts Initiate New Era In Polymer Synthesis", *Chemical & Engineering News*, Sep. 11, 1995, pp. 15–20.
Gerald Lancaster et al., "Applications of Insite* Technology in the Rubber/Elastomer Market", Proceedings of Fifth International Business Forum on Specialty Polyolefins SPO '95, Sep. 20–22, 1995, pp. 109–123 *Trademark of the Dow Chemical Company.
"Dow Plots PP Course", *Chemical Week*, Strategies, Dec. 20/27, 1995, p. 8.
Y.W. Cheung et al., "Structure, Thermal Transitions and Mechanical Properties of Ethylene/Styrene Copolymers", Proceeding of the SPE 54$^{th}$ Annual Technical Conference and Exhibits, pp. 1634–1637.
C.P. Park et al., "Compatibilization of Polyethylene–Polystyrene Blends with Ethylene–Styrene random Copolymers", Proceeding of the SPE 54$^{th}$ Annual Technical Conference and Exhibits, pp. 1887–1891.
"Metallocene Technology Drives New Materials", News Update, *Canadian Plastics*, Jan. 1996, vol. 54, No. 1, p. 8.
"Metallocene yield ethylene–styrene interpolymers", Newsfocus, *Plastics Technology*, Jan. 1996, pp. 13.
"Dow's plan's for '96: Become force in PP", *Plastics World*, Jan. 1996, pp. 12–13.
*Derwent Abstract 95–40100/51, Oct. 24, 1995 (JP 07278230).
Chemical Abstract 122:240559v Lu, Zejan et al, "Synthesis, structure and properties of styrene–ethylene copolymers", (Institute of Polymer Science, Zhongshan University, Guangzhou, 510275, 1994 (Translation).
International Search Report dated Oct. 6, 1997 issued by the European Patent Office acting as the International Search Authority in PCT/US96/14233.

*Primary Examiner*—Donald R. Wilson

[57] ABSTRACT

Blends of polymeric materials comprising (A) from about 1 to about 99 weight percent of at least one interpolymer containing (1) from about 1 to about 65 mole percent of (a) at least one vinylidene aromatic monomer, or (b) at least one hindered aliphatic vinylidene monomer, or (c) a combination of at least one vinylidene aromatic monomer and at least one hindered aliphatic vinylidene monomer, and (2) from about 35 to about 99 mole percent of at least one aliphatic α-olefin having from 2 to about 20 carbon atoms; and (B) from about 1 to about 99 weight percent of at least one homopolymer or interpolymer of one or more vinylidene aromatic monomers and/or one or more hindered aliphatic vinylidene monomers. These blends have been observed to possess improved properties when compared to the individual polymers comprising the blend and to provide materials with enhanced processability and temperature ranges of performance.

37 Claims, No Drawings

BLENDS OF SUBSTANTIALLY RANDOM INTERPOLYMERS WITH VINYL OR VINYLIDENE AROMATIC POLYMERS

This application is a continuation in part of application Ser. No. 08/469,828 filed Jun. 6, 1995, now U.S. Pat. No. 5,703,187, which is a division of application Ser. No. 07/545,403 filed Jul. 3, 1990 which is a continuation-in-part of application Ser. No. 07/401,345 filed Aug. 31, 1989 now abandoned, application Ser. No. 07/428,082, filed Oct. 27, 1989, now abandoned, application Ser. No. 07/428,283, filed Oct. 27, 1989, now abandoned, application Ser. No. 07/428,276, filed Oct. 27, 1989, now abandoned and application Ser. No. 07/520,168, filed May 9, 1990, now abandoned, which is a continuation of application Ser. No. 07/436,524, filed Nov. 14, 1989, now abandoned.

The present invention pertains to blends of α-olefin/hindered vinylidene monomer interpolymers and vinyl aromatic polymers; foams therefrom and also foams from only α-olefin/hindered vinylidene monomer interpolymers. The blend components and their ratio were selected to provide superior performance and/or processability.

The generic class of materials covered by α-olefin/hindered vinylidene monomer substantially random interpolymers and including materials such as α-olefin/vinyl aromatic monomer interpolymers are known in the art and offer a range of material structures and properties which makes them useful for varied applications, such as compatibilizers for blends of polyethylene and polystyrene as described in U.S. Pat. No. 5,460,818.

One particular aspect described by D'Anniello et al. (*Journal of Applied Polymer Science*, Volume 58, pages 1701–1706 (1995)) is that such interpolymers can show good elastic properties and energy dissipation characteristics. In another aspect, selected interpolymers can find utility in adhesive systems, as illustrated in U.S. Pat. No. 5,244,996, issued to Mitsui Petrochemical Industries Ltd.

Although of utility in their own right, Industry is constantly seeking to improve the applicability of these interpolymers. Such enhancements may be accomplished via additives or the like, but it is desirable to develop technologies to provide improvements in processability or performance without the addition of additives or further improvements than can be achieved with the addition of additives. To date, the possible advantages of blending to provide materials with superior properties have not been identified.

There is a need to provide materials based on α-olefin/vinylidene aromatic monomer interpolymers with superior performance characteristics to the unmodified polymers, which will further expand the utility of this interesting class of materials.

The present invention pertains to a blend of polymeric materials comprising
  (A) from about 1 to about 99 weight percent of at least one interpolymer comprising
    (1) from about 1 to about 65 mole percent of (a) at least one vinylidene aromatic monomer, or (b) at least one hindered aliphatic vinylidene monomer, or (c) a combination of at least one vinylidene aromatic monomer and at least one hindered aliphatic vinylidene monomer, and
    (2) from about 35 to about 99 mole percent of at least one aliphatic α-olefin having from 2 to about 20 carbon atoms; and
  (B) from about 1 to about 99 weight percent of
    (1) at least one homopolymer of one or more vinylidene aromatic monomers, or
    (2) at least one interpolymer of one or more vinylidene aromatic monomers and/or one or more hindered aliphatic vinylidene monomers, or
    (3) at least one of (1) or (2) which additionally contains an impact modifier, or
    (4) a combination of any two or more of (1), (2) or (3).

The present invention also pertains to expandable compositions comprising
  (I) at least one blowing agent; and
  (II) at least one interpolymer or blend of interpolymers comprising
    (A) from about 1 to about 100 percent by weight of at least one interpolymer comprising
      (1) from about 1 to about 65 mole percent of (a) at least one vinylidene aromatic monomer, or (b) at least one hindered aliphatic vinylidene monomer, or (c) a combination of at least one vinylidene aromatic monomer and at least one hindered aliphatic vinylidene monomer, and
      (2) from about 35 to about 99 mole percent of at least one aliphatic α-olefin having from 2 to about 20 carbon atoms; and
    (B) from 0 to about 95.5 percent by weight of at least one homopolymer of one or more vinylidene aromatic monomers and/or one or more hindered aliphatic vinylidene monomers, or at least one interpolymer of one or more vinylidene aromatic monomers and/or one or more hindered aliphatic vinylidene monomers and optionally one or more polymerizable ethylenically unsaturated monomers other than a more vinylidene aromatic monomer or more hindered aliphatic vinylidene monomer.

The blends and expandable materials of the present invention can comprise, consist essentially of or consist of any two or more of such interpolymers enumerated herein. Likewise, the interpolymers can comprise, consist essentially of or consist of any two or more of the enumerated polymerizable monomers.

These blends provide an improvement in one or more of the polymer properties such as, but not limited to, mechanical performance and/or melt processability.

The term "interpolymer" is used herein to indicate a polymer wherein at least two different monomers were polymerized to make the interpolymer.

The term "substantially random" in the substantially random interpolymer comprising an α-olefin and a vinylidene aromatic monomer or hindered aliphatic vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon*-13 *NMR Method*, Academic Press New York, 1977, pp. 71–78. Preferably, the substantially random interpolymer comprising an α-olefin and a vinylidene aromatic monomer does not contain more than 15 percent of the total amount of vinylidene aromatic monomer in blocks of vinylidene aromatic monomer of more than 3 units. More preferably, the interpolymer was not characterized by a high degree of either isotacticity or syndiotacticity. This means that in the 13C-NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The interpolymers suitable for use as component (A) to make the blends comprising the present invention include, but are not limited to, interpolymers prepared by polymerizing one or more α-olefins with one or more vinylidene aromatic monomers and/or one or more hindered aliphatic vinylidene monomers.

Suitable α-olefins include for example, those containing from 2 to about 20, preferably from 2 to about 12, more preferably from 2 to about 8 carbon atoms. Particularly suitable are ethylene, propylene, butene-1, 4-methyl-1-pentene, hexene-1 and octene-1.

Suitable vinylidene aromatic monomers include, for example, those represented by the following formula I:

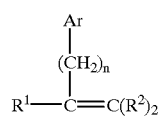

Formula I wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 6, preferably from zero to about 2, more preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- or phenyl-ring substituted derivatives of styrene, such as ortho-, meta-, and para-methylstyrene, the ring halogenated styrenes, para-vinyl toluene or mixtures thereof, and the like. A more preferred monovinylidene aromatic monomer is styrene.

By the term "hindered aliphatic or cycloaliphatic vinylidene monomers" is meant addition polymerizable vinylidene monomers corresponding to the following formula II:

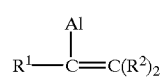

Formula II wherein and Al is a sterically bulky, aliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and Al together form a ring system. By the term "sterically bulky" is meant that the monomer bearing this substituent is normally incapable of addition polymerization by standard Ziegler-Natta polymerization catalysts at a rate comparable with ethylene polymerizations. Preferred hindered aliphatic or cycloaliphatic vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic vinylidene compounds are vinyl cyclohexane and the various isomeric vinyl-ring substituted derivatives of cyclohexene and substituted cyclohexenes, and 5-ethylidene-2-norbornene. Especially suitable is vinyl cyclohexane.

The interpolymers of one or more α-olefins and one or more monovinylidene aromatic monomers and/or one or more hindered aliphatic or cycloaliphatic vinylidene monomers employed in the present invention are substantially random polymers. These interpolymers usually contain from about 1 to about 65, preferably from about 5 to about 60, more preferably from about 10 to about 55 mole percent of at least one vinylidene aromatic monomer and/or hindered aliphatic or cycloaliphatic vinylidene monomer and from about 35 to about 99, preferably from about 40 to about 95, more preferably from about 45 to about 90 mole percent of at least one aliphatic α-olefin having from 2 to about 20 carbon atoms.

The number average molecular weight (Mn) of these interpolymers is usually greater than about 1,000, preferably from about 5,000 to about 1,000,000, more preferably from about 10,000 to about 500,000.

The present invention provides blends of interpolymer components of molecular weight and composition distributions selected to obtain an overall molecular weight and composition distribution which gives enhanced properties or processability.

The blends of the present invention comprise from about 1 to about 99, preferably from about 3 to about 97, more preferably from about 5 to about 95 percent of component (A) by weight and from about 99 to about 1, preferably from about 97 to about 3, more preferably from about 95 to about 5 percent of component (B) by weight. Those blends of the present invention containing from about 35 to about 99, preferably from about 40 to about 97, more preferably from about 60 to about 95 percent of component (A) by weight and from about 65 to about 1, preferably from about 60 to about 3, more preferably from about 40 to about 5 percent of component (B) by weight are of particular interest in that in some instances, they possess much improved properties when compared to those blends containing less than about 35 percent by weight of component (A).

While preparing the substantially random interpolymers, component (A), as will be described hereinafter, an amount of atactic vinylidene aromatic homopolymer may be formed due to homopolymerization of the vinylidene aromatic monomer. In general, the higher the polymerization temperature, the greater the amount of homopolymer formed. The presence of vinylidene aromatic homopolymer is in general not detrimental for the purposes of the present invention and may be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present in the interpolymer blend component.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 545,403 filed Jul. 3, 1990 (corresponding to EP-A-0,416,815) by James C. Stevens et al., both of which are incorporated herein by reference in their entirety. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerization.

Examples of suitable catalysts and methods for preparing the substantially random interpolymers are disclosed in U.S. application Ser. No. 545,403, filed Jul. 3, 1990 (EP-A-416, 815); U.S. application Ser. No. 702,475, filed May 20, 1991 (EP-A-514,828); U.S. application Ser. No. 876,268, filed May 1, 1992, (EP-A-520,732); U.S. application Ser. No. 241,523, filed May 12, 1994; as well as U.S. Pat. Nos.: 5,055,438; 5,057,475; 5,096,867; 5,064,802; 5,132,380; 5,189,192; 5,321,106; 5,347,024; 5,350,723; 5,374,696; and 5,399,635 all of which patents and applications are incorporated herein by reference.

The substantially random α-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which possess at least one α-olefin/vinyl aromatic/vinyl aromatic/α-olefin tetrad disclosed in a copending application by Francis J. Timmers et al. filed on the same date as this application. These interpolymers contain additional signals with intensities greater than three times the peak to peak noise. These signals appear in the chemical shift range 43.75–44.25 ppm and 38.0–38.5 ppm. Specifically, major peaks are observed at 44.1, 43.9 and 38.2 ppm. An Attached Proton Test (APT) NMR experiment indicates that the signals in the chemical shift region 43.75–44.25 ppm are methine carbons and the signals in the region 38.0–38.5 ppm are methylene carbons.

In order to determine the carbon-13 NMR chemical shifts of these interpolymers, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 90° pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one α-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the α-olefin/vinyl aromatic monomer/vinyl aromatic monomer/α-olefin tetrad will give rise to similar carbon-13 NMR peaks but with slightly different chemical shifts.

These interpolymers are prepared by conducting the polymerization at temperatures of from about −30° C. to about 250° C. in the presence of such catalysts as those represented by the formula

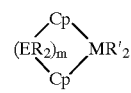

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

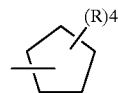

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl, or substituted derivatives of these fused ring systems.

Particularly preferred catalysts include, for example, racemic-(dimethylsilanediyl)-bis-(2-methyl-4- phenylindenyl))zirconium dichloride, racemic-(dimethylsilanediyl)-bis-(2-methyl-4-phenylindenyl)) zirconium 1,4-diphenyl-1,3-butadiene, racemic-(dimethylsilanediyl)-bis-(2-methyl4-phenylindenyl)) zirconium di-$C_{1-4}$ alkyl, racemic-(dimethylsilanediyl)-bis-(2-methyl4-phenylindenyl)) zirconium di-$C_{1-4}$ alkoxide, or any combination thereof and the like.

Further preparative methods for the interpolymer blend component (A) of the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienylti-tanium trichloride ($CpTiCl_3$) to prepare an ethylene-styrene copolymer. Xu and Lin (*Polymer Preprints, Am.Chem.Soc., Div. Polym. Chem.*) Volume 35, pages 686,687 [1994]) have reported copolymerization using a $TiCl_4/NdCl_3/Al(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_4/NdCl_3/MgCl_2/Al(Et)_3$ catalyst. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer blend components are incorporated herein by reference.

The polymers of vinylidene aromatic monomers employed as component (B) in the present invention include homopolymers of a single vinylidene aromatic monomer or interpolymers prepared from one or more vinylidene aromatic monomers. Particularly suitable are the monovinylidene aromatic monomers.

Suitable monovinylidene aromatic polymers for use in component (B) of the present blends and/or expandable compositions include homopolymers or interpolymers of one or more monovinylidene aromatic monomers, or an interpolymer of one or more monovinylidene aromatic monomers and one or more monomers interpolymerizable therewith other than an aliphatic α-olefin. Suitable monovinylidene aromatic monomers are represented by the following formula:

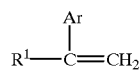

wherein $R^1$ is selected from the group of radicals consisting of hydrogen and hydrocarbyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl. Exemplary monovinylidene aromatic monomers include styrene, para-vinyl toluene, α-methylstyrene, t-butyl styrene, chlorostyrene, including all isomers of these compounds, etc. Styrene is a particularly desirable monovinylidene aromatic monomer for the monovinylidene aromatic polymers used in the practice of the present invention.

Examples of suitable interpolymerizable comonomers other than a monovinylidene aromatic monomer include $C_4$–$C_6$ conjugated dienes, especially butadiene or isoprene, α-methylstyrene N-phenyl maleimide, N-allyl maleimide, acrylamide, ethylenically-unsaturated nitrile monomers such as acrylonitrile and methacrylonitrile, ethylenically-unsaturated mono-and difunctional carboxylic acids and derivatives thereof such as esters and, in the case of difunctional acids, anhydrides, such as acrylic acid, $C_{1-4}$-alkylacrylates or methacrylates, such as n-butyl acrylate and methyl methacrylate, maleic anhydride, and the like or any combination thereof. In some cases it is also desirable to copolymerize a cross-linking monomer such as a divinyl benzene into the monovinylidene aromatic polymer.

The polymers of monovinylidene aromatic monomers with other interpolymerizable comonomers preferably contain, polymerized therein, at least 50 mole percent, preferably at least 60 mole percent, and more preferably at least 70 mole percent of one or more monovinylidene aromatic monomers.

Component B may also be a flame resistant rubber modified styrenic blend composition. The flame resistant compositions are typically produced by adding flame retardants to a high impact polystyrene (HIPS) resin. The addition of flame retardants lowers the impact strength of the HIPS which is restored back to acceptable levels by the addition of impact modifiers, typically styrene-butadiene (SBS) block copolymers. The final compositions are referred to as ignition resistant polystyrene, IRPS. The IRPS compositions typically contain the following components:

Component R) from about 50 to about 90 percent by weight based on total resin composition (R+S+T+U) of a rubber modified polymer derived from a vinyl aromatic monomer, e.g. HIPS, Component S) a sufficient amount of halogen-containing flame retardant to provide the composition (R+S+T+U) with 7 to 14 percent by weight halogen, Component T) from about 2 to about 6 percent by weight based on total resin composition (R+S+T+U) of an inorganic flame retardant synergist, and Component U) from about 1 to about 8 percent by weight based on total resin composition (R+S+T+U) of an impact modifier.

Component R is a rubber modified vinyl aromatic polymer. Suitable polymers include those made from vinyl aromatic monomers typically represented by the formula:

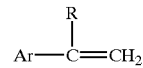

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halogen substituted alkyl group. Preferably, Ar is phenyl or alkylphenyl with phenyl being most preferred. Typical vinyl aromatic monomers which can be used include: styrene, alpha-methylstyrene, all isomers of vinyl toluene, especially para-vinyltoluene, all isomers of ethyl styrene, propyl styrene, vinyl biphenyl, vinyl naphthalene, vinyl anthracene and the like, and mixtures thereof. The vinyl aromatic monomer may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate, maleic anhydride, maleimide, and phenylmaleimide.

Rubber modified vinyl aromatic polymers can be prepared by polymerizing the vinyl aromatic monomer in the presence of a predissolved rubber to prepare impact modified, or grafted rubber containing products, examples of which are described in U.S. Pat. Nos. 3,123,655, 3,346,520, 3,639,522, and 4,409,369 which are herein incorporated by reference. The rubber is typically a butadiene or isoprene rubber, preferably polybutadiene. Preferably, the rubber modified vinyl aromatic polymer is high impact polystyrene (HIPS).

The amount of rubber modified vinyl aromatic polymer used in the composition of the present invention is typically from about 50 to about 90, preferably from about 60 to about 88, more preferably from about 70 to about 85 and most preferably from about 72 to about 82, percent by weight based on total resin composition (R+S+T+U).

Component U is an impact modifier which can be any polymer which will increase the impact strength of the composition of the present invention. Typical impact modifiers include polybutadiene, polyisoprene, and copolymers of a vinyl aromatic monomer and a conjugated diene, e.g. styrene-butadiene copolymers, styrene-isoprene copolymers, including diblock and triblock copolymers. Other impact modifiers include copolymers of a vinyl aromatic monomer with hydrogenated dienes, ethylene-acrylic acid copolymers and ethylene-styrene copolymers. Preferably, the impact modifier is a styrene-butadiene-styrene triblock copolymer containing from about 25 to about 40 weight percent styrene component. When an ethylene/styrene interpolymer is employed as the impact modifier, the blend of the ethylene/styrene interpolymer and the polystyrene is a blend of the present invention.

The amount of impact modifier used in the composition of the present invention is typically from about 1 to about 8, preferably from about 1 to about 7, more preferably from about 2 to about 6, and most preferably from about 2 to about 5 percent by weight of total resin composition (R+S+T+U).

Component S is a flame retardant which can be any halogen-containing compound or mixture of compounds which imparts flame resistance to the composition of the present invention. Suitable flame retardants are well-known in the art and include but are not limited to hexahalodiphenyl ethers, octahalodiphenyl ethers, decahalodiphenyl ethers, decahalobiphenyl ethanes, 1,2-bis(trihalophenoxy)ethanes, 1,2-bis(pentahalophenoxy)ethanes, hexahalocyclododecane, a tetrahalobisphenol-A, ethylene(N, N')-bis-tetrahalophthalimides, tetrahalophthalic anhydrides, hexahalobenzenes, halogenated indanes, halogenated phosphate esters, halogenated paraffins, halogenated polystyrenes, and polymers of halogenated bisphenol-A and epichlorohydrin, or mixtures thereof. Preferably, the flame retardant is a bromine or chlorine containing compound. In a preferred embodiment, the flame retardant is decabromodiphenyl ether or a mixture of decabromodiphenyl ether with tetrabromobisphenol-A.

The amount of flame retardant present within the composition of the present invention will depend upon the halogen content of the specific flame retardant used. Typically, the amount of flame retardant is chosen such that from about 7 to about 14, preferably from about 7 to about 13, more preferably from about 8 to about 12 and most preferably from about 9 to 11 percent by weight of total resin composition (R+S+T+U) of halogen is present in the composition of the present invention.

Component T is an inorganic flame retardant synergist which are known in the art as compounds which enhance the effectiveness of flame retardants, especially halogenated flame retardants. Examples of inorganic flame retardant synergists include but are not limited to metal oxides, e.g. iron oxide, tin oxide, zinc oxide, aluminum trioxide, alumina, antimony tri- and pentoxide, bismuth oxide, molybdenum trioxide, and tungsten trioxide, boron compounds such as zinc borate, antimony silicates, ferrocene and mixtures thereof.

The amount of inorganic flame retardant synergist present is typically from about 2 to about 6, preferably from about 2 to about 5, more preferably from about 2.5 to about 5 and most preferably from about 2.5 to about 4 percent by weight of total resin composition (R+S+T+U).

The compositions of the present invention may also contain minor amounts of typical processing aids such as mold release agents, plasticizers, flow promoters, e.g. waxes or mineral oil, pigments, thermal stabilizers, UV stabilizers, antioxidants, fillers, e.g. glass fibers, glass beads, and the like.

The composition can be produced by any blending or mixing technique which will result in a generally uniform dispersion of all ingredients throughout the resulting product. Illustrative devices include Banbury mixers, compounding rolls, single screw extruders, twin screw extruders, and the like. Additionally, the components of the composition can be combined in an apparatus such as a dry blender before being fed into a mixing/melting extruder apparatus, or two or more of the ingredients may be pre-mixed and fed into a hot melt of the remaining components.

Suitable homopolymers and interpolymers which can be employed in the foam compositions of the present invention include those enumerated above plus interpolymers prepared from (a) one or more vinylidene aromatic monomers and/or one or more one hindered aliphatic vinylidene monomers and (b) optionally, one or more polymerizable ethylenically unsaturated monomers different from those enumerated in (a). Suitable such polymerizable ethylenically unsaturated monomers include, for example, ethylenically unsaturated monocarboxylic acids having from 3 to about 8, preferably from 3 to about 6, more preferably from 3 to about 4 carbon atoms; anhydrides of ethylenically unsaturated dicarboxylic acids having from 4 to about 10, preferably from about 4 to about 8, more preferably from about 4 to about 6 carbon atoms; esters of ethylenically unsaturated monocarboxylic acids; ethylenically unsaturated nitrites; or any combination thereof and the like. Particularly suitable such monomers include, for example, acrylic acid, methacrylic acid, methyl acrylate, methyl methacrylate, ethyl acrylate, ethyl methacrylate, propyl acrylate, propyl methacrylate, butyl acrylate, butyl methacrylate, maleic anhydride, acrylonitrile, methacrylonitrile or any combination thereof. The interpolymers can contain from zero up to about 50, preferably up to about 40, more preferably up to about 30 weight percent of such monomers which are different from the monomers of (a).

The blends of the present invention may be prepared by any suitable means known in the art such as, but not limited to, dry blending in a pelletized form in the desired proportions followed by melt blending in a screw extruder, Banbury mixer or the like. The dry blended pellets may be directly melt processed into a final solid state article by for example injection molding. Alternatively, the blends may be made by direct polymerization, without isolation of the blend components, using for example two or more catalysts in one reactor, or by using a single catalyst and two or more reactors in series or parallel.

An example of making the blend directly by polymerization is an in-reactor blend method as described in U.S. Pat. No. 4,168,353. That is, styrene monomer is impregnated into granules of an interpolymer blend component (A) suspended in a suitable liquid medium and graft-polymerized. The resultant blend granules are cooled and discharged from the vessel.

The present foam structure may take any physical configuration known in the art, such as sheet, plank, or bun stock. Other useful forms are expandable or foamable particles, moldable foam particles, or beads, and articles formed by expansion and/or coalescing and welding of those particles.

Teachings to processes for making ethylenic polymer foam structures and processing them are seen in C. P. Park, "Polyolefin Foam", Chapter 9, *Handbook of Polymer Foams and Technology*, edited by D. Klempner and K. C., Hanser Publishers, Munich, Vienna, New York, Barcelona (1991), which is incorporated herein by reference.

The present foam structure may be made by a conventional extrusion foaming process. The structure is generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level. By this process, plank, sheet, rod and tube-shaped foam products are prepared.

The present foam structure may be formed in a coalesced strand form by extrusion of the ethylenic polymer material through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are seen in U.S. Pat. Nos. 3,573,152 and 4,824,720, both of which are incorporated herein by reference.

The present foam structure may also be formed by an accumulating extrusion process as seen in U.S. Pat. No. 4,323,528, which is incorporated by reference herein. In this process, low density foam structures having large lateral cross-sectional areas are prepared by: 1) forming under pressure a gel of the ethylenic polymer material and a blowing agent at a temperature at which the viscosity of the gel is sufficient to retain the blowing agent when the gel is allowed to expand; 2) extruding the gel into a holding zone maintained at a temperature and pressure which does not allow the gel to foam, the holding zone having an outlet die defining an orifice opening into a zone of lower pressure at which the gel foams, and an openable gate closing the die orifice; 3) periodically opening the gate; 4) substantially concurrently applying mechanical pressure by a movable ram on the gel to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected gel to expand unrestrained in at least one dimension to produce the foam structure.

The present foam structure may also be formed into non-crosslinked foam beads suitable for molding into articles. To make the foam beads, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

Expandable and expanded beads can be made by a batch or by an extrusion process. The batch process of making expandable beads is essentially the same as for manufacturing expandable polystyrene (EPS). The granules of a polymer blend, made either by melt blending or in-reactor blending as described above, are impregnated with a blowing agent in an aqueous suspension or in an anhydrous state in a pressure vessel at an elevated temperature and pressure. The granules are then either rapidly discharged into a region of reduced pressure to expand to foam beads or cooled and discharged as unexpanded beads. The unexpanded beads are then heated to expand with a proper means, e.g., with steam or with hot air. The extrusion method is essentially the same as the conventional foam extrusion process as described above up to the die orifice. The die has multiple holes. In order to make unfoamed beads, the foamable strands exiting the die orifice are immediately quenched in a cold water bath to prevent foaming and then pelletized. Or, the strands are converted to foam beads by cutting at the die face and then allowed to expand.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to blocks or shaped articles by a suitable molding method known in the art. (Some of the methods are taught in U.S. Pat. Nos. 3,504,068 and 3,953,558.) Excellent teachings of the above processes and molding methods are seen in C. P. Park, supra, p. 191, pp. 197–198, and pp. 227–229, which are incorporated herein by reference.

Blowing agents useful in making the present foam structure include inorganic blowing agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), 1,1,2,2-tetrafluoroethane (HFC 134), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1 difluoroethane (HCFC-142b), 1,1-dichloro-2,2,2-trifluoroethane (HCFC-123) and 1-chloro-1,2,2,2-tetrafluoroethane(HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include sodium bicarbonate, mixtures of sodium bicarbonate and citric acid, azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihycrazino triazine. Preferred blowing agents depend upon the process and product. For manufacturing a low-density foam by the exturion process, a volatile organic blowing agent or carbon dioxide is preferred. Preferred volatile organic blowing agents include n-butane, isobutane, n-pentane, isopentane, HFC-152a, and mixtures thereof. For manufacturing an expandable bead product, isobutane, n-pentane, isopentane and mixtures thereof are preferred.

The amount of blowing agents incorporated into the polymer melt material to make a foam-forming polymer gel is from about 0.05 to about 5.0, preferably from about 0.2 to about 4.0, and most preferably from about 0.5 to 3.0 gram moles per kilogram of polymer.

Various additives may be incorporated in the present foam structure such as nucleating agents, inorganic fillers, pigments, antioxidants, acid scavengers, ultraviolet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin.

The present foam structure is substantially noncross-linked or uncross-linked. The alkenyl aromatic polymer material comprising the foam structure is substantially free of cross-linking. The foam structure contains no more than 5 percent gel per ASTM D-2765-84 Method A. A slight degree of cross-linking, which occurs naturally without the use of cross-linking agents or radiation, is permissible.

The present foam structure has density of less than 450, more preferably less than 200 and most preferably from about 10 to about 80 kilograms per cubic meter. The foam has an average cell size of from about 0.02 to about 5.0, more preferably from about 0.2 to about 2.0, and most preferably 0.3 to about 1.8 millimeters according to ASTM D3576.

The present foam structure may take any physical configuration known in the art, such as extruded sheet, rod, plank, and profiles. The foam structure may also be formed by molding of expandable beads into any of the foregoing configurations or any other configuration.

The present foam structure may be closed-celled or open-celled. Preferably, the present foam contains 80 percent or more closed cells according to ASTM D2856-A.

Additives such as antioxidants (e.g., hindered phenols such as, for example, IRGANOX® 1010), phosphites (e.g., IRGAFOS® 168)), uv stabilizers, cling additives (e.g., polyisobutylene), antiblock additives, colorants, pigments, fillers, and the like can also be included in the interpolymers employed in the blends of the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants is usually in the range of from about 0.01 to about 10, preferably from about 0.05 to about 5, more preferably from about 0.1 to about 2 percent by weight based upon the weight of the polymer or polymer blend.

Similarly, the amounts of any of the other enumerated additives are the functionally equivalent amounts such as the amount to render the polymer or polymer blend antiblocking, to produce the desired amount of filler loading to produce the desired result, to provide the desired color from the colorant or pigment. Such additives can suitably be employed in the range of from about 0.05 to about 50, preferably from about 0.1 to about 35 more preferably from about 0.2 to about 20 percent by weight based upon the weight of the polymer or polymer blend. However, in the instance of fillers, they could be employed up to about 90 percent by weight based on the weight of the polymer or polymer blend.

The blends of the present invention can be utilized to produce a wide range of fabricated articles such as, for example but not limited to, calendered sheet, blown films and injection molded parts, and the like. The blends can also be used in the manufacture of fibers, foams and latices. The blends of the present invention can also be utilized in adhesive formulations.

The compositions of the present invention containing ignition resistant polystyrene modified with ethylene/styrene interpolymers can be used in infection molding applications to manufacture TV cabinets, computer monitors, printer housings and the like.

The following examples are illustrative of the invention, but are not to be construed as to limiting the scope thereof in any manner.

TESTING

The properties of the polymers and blends were determined by the following test procedures Melt Flow Rate (MFR) was determined by ASTM D-1238 (1979), Condition E (190° C.; 2.16 kg).

Tensile Strength was determined by ASTM D-882-91, Procedure A except: Five replications of the test were made for each polymer blend tested. Grip separation was always 1 inch (2.54 cm). Grip separation speed was always 5 mm/min.

Modulus was determined by ASTM D-882-91, Procedure A except: Five replications of the test were made for each polymer blend tested. Grip separation was always 1 inch (2.54 cm). Grip separation speed was always 5 mm/min.

Elongation was determined by ASTM D-882-91, Procedure A except: Five replications of the test were made for each polymer blend tested. Grip separation was always 1 inch (2.54 cm). Grip separation speed was always 5 mm/min.

Toughness was determined by ASTM D-882-91, Procedure A2.1 except: Five replications of the test were made for each polymer blend tested. Grip separation was always 1 inch (2.54 cm). Grip separation speed was always 5 mm/min.

Preparation of Ethylene/Styrene Interpolymers A–G

A two liter stirred reactor was charged with about 500 ml of mixed alkane solvent (ISOPAR™ E available from Exxon Chemicals Inc.) and ca. 500 ml of styrene comonomer. Hydrogen was then added by differential pressure expansion from a 75 ml shot tank. The reactor was heated to the desired run temperature and the reactor was saturated with ethylene at the desired pressure. The (tertamethylcyclopentadienyl) (tert-butylamido)di-methylsilane titanium dimethyl catalyst and tris(pentafluorophenyl)borane cocatalyst were mixed in a dry box by mixing the catalyst and cocatalyst in ISO-PAR™ E in an inert atmosphere glove box. The resulting solution was transferred to a catalyst addition tank and injected into the reactor. The polymerization was allowed to proceed with ethylene on demand. Subsequent additions of catalyst solution prepared in the same manner were optionally added during the run. After the run time the polymer solution was removed from the reactor and mixed with 100 mg of IRGANOX™ 1010 in 10 ml of toluene. The polymers were precipitated with propanol and the volatiles were removed from the polymers in a reduced pressure vacuum oven at 120° C. for ca. 20 hr.

The monomer amounts and polymerization conditions are provided in Table 1A. The yield and polymer properties are provided in Table 1B.

2.5. The level of the ES copolymer in the blend was varied from 0 to 40%. The tests were as follows. A total of 40 grams of granular resin mixture was melt blended by using a Haake Rheocord Model 90 mixer for 15 minutes at 180° C. and 30 rpm rotor speed under a nitrogen blanket. The blends were pressed to thin sheets of approximately 0.9 mm thickness on a hot press maintained at 177° C. The sheets were cut into ½" (1.27 cm)-wide strips by using a Thwing-Albert Model LDC-50 cutter. Tensile properties of the specimens were determined by using an Instron 1123 tensile tester at 5 mm/min cross-head speed and 1' (2.54 cm) jaw span. Five specimens were run for each blend and the average of the five data points was reported as the representative property for the blend.

The test results are shown in Table 2. At an ES level lower than 40%, the blend does not show a measurable improvement in mechanical toughness. At the blend level of 40%, these properties of the blend become dramatically improved. A 60/40: PS/ES blend was elongatable to over 70% of its original length and has a relatively high modulus. A transmission electron microscope micrograph shows that the blend has a co-continuous structure.

TABLE 1A

| Inter-polymer | Isopar™ E (g) | Styrene (g) | Hydrogen (delta) psig | Hydrogen (delta) kPa | Ethylene psig | Ethylene kPa | Run Time (min) | Run Temp (° C.) | Catalyst (μmol) |
|---|---|---|---|---|---|---|---|---|---|
| A | 358 | 455 | 0 | 0 | 200 | 1,379 | 80 | 80 | 20 |
| B | 361 | 454 | 13 | 90 | 250 | 1,724 | 20 | 80 | 5 |
| C | 361 | 458 | 11 | 76 | 150 | 1,034 | 20 | 80 | 6 |
| D | 361 | 461 | 11 | 76 | 100 | 689 | 20 | 80 | 9 |
| E | 365 | 461 | 0 | 0 | 100 | 689 | 30 | 80 | 12 |
| F | 420 | 380 | 0 | 0 | 50 | 345 | 30 | 80 | 25 |
| G | 361 | 358 | 12 | 83 | 50 | 345 | 30 | 60 | 15 |
| H | 0 | 768 | 16 | 103 | 50 | 345 | 30 | 60 | 20 |
| I | 361 | 461 | 11 | 69 | 300 | 2,068 | 20 | 80 | 4 |

TABLE 1B

| Interpolymer | Yield (g) | Melt Flow Rate (dg/min) | Styrene Content in Interpolymer (mol %) | Styrene Content in Interpolymer (Wt. %) | E/S Interpolymer (Wt. %) | Amorphous Polystyrene (Wt. %) |
|---|---|---|---|---|---|---|
| A | 72.7 | 0.195 | 20.1 | 48.3 | 96 | 4 |
| B | 69.9 | 0.40 | 7.4 | 22.9 | 99.6 | 0.4 |
| C | 57.7 | 0.74 | 17.8 | 44.6 | 98.1 | 1.9 |
| D | 48.4 | 3.62 | 24.9 | 55.2 | 97.8 | 2.2 |
| E | 59.3 | 1.52 | 26.5 | 57.3 | 97.4 | 2.6 |
| F | 85.6 | 13.1 | 34.3 | 66.0 | 94.8 | 5.2 |
| G | 114.7 | 1.07 | 41.0 | 72.1 | 98.6 | 1.4 |
| H | 96 | 0.92 | 47.3 | 76.9 | 94.8 | 5.2 |
| I | 67 | 0.14 | 8.4 | 25.4 | 98 | 2 |

TABLE 2

| Test No. | ES Level (%) (1) | Tensile Strength (MPa) (2) | Elongation @ Break (%) (3) | Toughness (MJ/cu · m) (4) | Modulus (MPa) (5) |
|---|---|---|---|---|---|
| 1.1* | 0 | 39.2 | 5.4 | 1.2 | 924 |
| 1.2 | 10 | 28.1 | 4.4 | 0.6 | 827 |
| 1.3 | 20 | 24.5 | 3.3 | 0.5 | 965 |
| 1.4 | 30 | 35.7 | 5.2 | 1.0 | 972 |
| 1.5 | 40 | 27.6 | 70.2 | 18.5 | 876 |

*Not an example of the present invention
(1) ethylene/styrene interpolymer H mixed in as a percentage of the total polymer blend.
(2) Tensile strength at break in megapascals.
(3) Elongation at break in a percentage of the initial length.
(4) Toughness determined by the area under the tensile curve in megajoules per cubic meter.
(5) 2% secant modulus in megapascals.

EXAMPLE 1

A. Ethylene/styrene interpolymer

The ethylene/styrene interpolymer designated as H in Tables 1A & 1B was employed in this example.

B. Preparation of blend of E/S interpolymer and polystyrene.

The polymer material was pelletized and blended with a general purpose polystyrene (PS) having a weight average molecular weight of about 200,000 and a polydispersity of

EXAMPLE 2

In this example, the tests of Example 1 were repeated with six different ES interpolymers with varying ethylene/styrene ratios and melt indices. The ES interpolymers were prepared as shown in Table 1A employing different ethylene/styrene ratios. All materials contained a small amount (less than 5.2%) of amorphous polystyrene. Forty parts of each ES interpolymer was blended with sixty parts of polystyrene as employed in Example 1. As shown in Table 3, all the ES interpolymer materials led to toughened polyblends. In general, an ES interpolymer having a higher level of styrene performs better. The ES interpolymer that was used in Test No. 2.5 was an exception. The performance of the resin falls off from the general trend. It is believed that the high melt index (or low viscosity) of the material is responsible for the relatively poor performance.

TABLE 3

| | E/S Interpolymer | | | Tensile Properties of polyblends | | | |
|---|---|---|---|---|---|---|---|
| Test No. | Type | Styrene % (1) | MFR dg/Min (2) | Tensile Strength @ Break (MPa) (3) | Elongation @ Break (%) (4) | Toughness (MJ/m³) (5) | Modulus (MPa) (6) |
| 2.1 | B | 7.4 | 0.40 | 19.9 | 21.4 | 3.5 | 356 |
| 2.2 | I | 8.4 | 0.14 | 24.3 | 13.8 | 2.6 | 483 |
| 2.3 | C | 17.8 | 0.74 | 15.6 | 57.4 | 9.4 | 315 |
| 2.4 | E | 26.5 | 1.52 | 12.1 | 87.6 | 11.2 | 303 |
| 2.5 | F | 34.3 | 13.1 | 14.5 | 30.1 | 4.2 | 381 |
| 2.6 | G | 41.0 | 1.07 | 25.1 | 268.0 | 61.1 | 430 |

(1) Styrene content of ES interpolymer in mole percent.
(2) Melt index of ES interpolymer determined per ASTM 1238 at 190° C./2.16 kg.
(3) Tensile strength at break in megapascals.
(4) Elongation at break in a percentage of the initial length.
(5) Toughness determined by the area under the tensile curve in megajoules per cubic meter.
(6) 2% secant modulus in megapascals.

EXAMPLE 3

In this example, Test 2.6 was repeated with substitution of the polystyrene component with another polystyrene having a weight average molecular weight of 300,000 and polydispersity of 2.4 As shown in Table 4, this resin blend has the desired toughness and relatively high modulus.

TABLE 4

| Test No. | ES Level (%) (1) | Tensile Strength (MPa) (2) | Elongation @ Break (%) (3) | Toughness (MJ/m³) (4) | Modulus (MPa) (5) |
|---|---|---|---|---|---|
| 3.1 | 40 | 17.5 | 207.0 | 44.4 | 382 |

(1) ethylene/styrene interpolymer G (41.0 mole % styrene, 1.07 melt flow rate) mixed in as a percentage of the total polymer.
(2) Tensile strength at break in megapascals.
(3) Elongation at break in a percentage of the initial length.
(4) Toughness determined by the area under the tensile curve in megajoules per cubic meter.
(5) 2% secant modulus in megapascals.

EXAMPLE 4

In this example, an ES interpolymer (Interpolymer A in Tables 1A and 1B) having 20.1 mole % (48.3 weight percent) styrene was blended, at 10 and 20 percent level, with a polystyrene resin as used in Example 1. The ES interpolymer contains approximately 4% amorphous polystyrene in the total polymer. As shown in Table 5, an ES interpolymer level up to 20% in the blends was insufficient for achieving a tough blend.

TABLE 5

| Test No. | ES Level (%) (1) | Tensile Strength (MPa) (2) | Elongation @ Break (%) (3) | Toughness (MJ/cu · m) (4) | Modulus (MPa) (5) |
|---|---|---|---|---|---|
| 4.1 | 10 | 27.4 | 4.1 | 0.6 | 869 |
| 4.2 | 20 | 31.6 | 5.6 | 1.1 | 800 |
| 4.3 | 20 | 36.2 | 6.5 | 1.3 | 855 |

(1) ethylene/styrene interpolymer (20.1 mole % styrene, 0.2 melt flow rate) mixed in as a percentage of the total polymer.
(2) Tensile strength at break in megapascals.
(3) Elongation at break in a percentage of the initial length.
(4) Toughnesss determined by the area under the tensile curve in megajoules per cubic meter.
(5) 2% secant modulus in megapascals.

COMPARATIVE EXPERIMENT A

Not an Example of the Present Invention

In this comparative experiment, the polystyrene in Example 1 was blended with a commercial styrene-butadiene-styrene tri-block interpolymer (SBS) (VECTOR™ 6241-D available from Dexco Polymers). As shown in Table 6, a 60/40: PS/SBS blend has a good elongation and desired toughness. However, the blend lacks stiffness (as Indicated by the lower modulus values) compared to the PS/ES blends. A high modulus was desired for most applications of the polymer blends.

TABLE 6

| Test No. | SBS Level (%) (1) | Tensile Strength (MPa) (2) | Elongation @ Break (%) (3) | Toughness (MJ/m³) (4) | Modulus (Mpa) (5) |
|---|---|---|---|---|---|
| 5.1* | 40 | 22.5 | 244.0 | 44.0 | 272 |

*Not an example of the present invention.
(1) VECTOR ™ 6241-D brand SBS interpolymer (Dexco Polymers) mixed in as a percentage of the total polymer
(2) Tensile strength at break in megapascals
(3) Elongation at break in a percentage of the initial length
(4) Toughness determined by the area under the tensile curve in megajoules per cubic meter
(5) 2% secant modulus in megapascals

EXAMPLE 5

Preparation of ES Copolymer

An ethylene-styrene (ES) substantially random copolymer identified as H in tables 1A & B was employed in this example. This ES copolymer contains 76.9 weight (47.3 mol) percent styrene moiety and has a melt index of 0.92 as determined by ASTM D-1238 at 190° C./2.16 kg.

Expandability Testing

The blends used in this example were those prepared in Example 1. The blends were compression-molded in a mold of approximately 1" (25.4 mm) in diameter and 0.1" (2.5 mm) in depth on a hot press that was maintained at approximately 180° C.

The disc-shaped specimens, three per formulation, were loaded in a pressure vessel on wire mesh trays lined with Teflon™ fluoropolymer. The trays were suspended by a support so as not to be in a direct contact with the liquid blowing agent that would be subsequently charged in and settled at the bottom of the vessel. Approximately 2.8 grams of isopentane was charged into the vessel. With its lid closed and the air purged out with nitrogen, the vessel was heated in an oil bath maintained at 60° C. for about 6 days. The vessel was cooled down and the specimens were removed. The thickness of the specimens after blowing agent impregnation ranges from 70 mils (1.8 mm) to 127 mils (3.2 mm). Shortly after, one specimen per each formulation was cut into halves and the cut pieces were exposed to atmospheric steam for five minutes. As shown in Table 7, PS/ES blends absorb isopentane in excess of 10 parts per one hundred parts of polymer (pph) and expanded to reasonably low densities. The 90/10:PS/ES blend achieves the lowest density of 44 kg/m$^3$.

In contrast, the pure polystyrene specimen absorbs less than 3 pph isopentane and expands to 94 kg/m$^3$ density. The relatively high density foam which results with the 60/40:PS/ES blend was probably due to an excessively long exposure to steam. The blend foam showed a sign of shrinkage when taken out of the steam pot.

TABLE 7

Expandability of PS/ES Blends Impregnated with Isopentane

| Test No. | Formulation (1) | Thickness (mm) (2) | iC$_5$ Level (pph) (3) | Foam Density (4) | |
|---|---|---|---|---|---|
| | | | | (#/ft$^3$) | (Kg/m$^3$) |
| 5.1* | PS | 1.8 | 3.0 | 5.9 | 94 |
| 5.2 | PS/ES 90/10 | 2.1 | 14.3 | 2.7 | 44 |
| 5.3 | PS/ES 80/20 | 2.8 | 13.8 | 3.8 | 61 |
| 5.4 | PS/ES 70/30 | 3.2 | 11.6 | 4.8 | 77 |
| 5.5 | PS/ES 60/40 | 3.0 | 10.3 | 8.3 | 133 |

*Not an example of the present invention.
(1) PS = general purpose polystyrene having 200,000 weight average molecular weight; ES = ethylene-styrene copolymer made with 76.9 wt. % styrene and having 0.92 M.I.
(2) Thickness of the specimen in millimeters.
(3) Amount of isopentane contained in the specimen immediately after impregnation in parts per 100 parts of polymer.
(4) Density of foam body achieved by expansion of fresh specimens in atmospheric steam for 5 minutes in both pounds per cubic foot and kilogram per cubic meter.

Blowing Agent Retention

The blowing agent retention capability of the specimens impregnated with isopentane above was examined by periodically weighing the specimens during aging at an ambient temperature of 23° C. The monitoring continued for 8 months and the data were summarized in Table 10. Since the fractional loss of blowing agent was inversely proportional to the square of the thickness, the data need to be compared in terms or corrected aging time; corrected for 2 mm-thick specimens. For ease of comparison, the data were interpolated to give blowing agent retention at a discrete aging time as presented in Table 8. The data indicate that PS/ES blends retain isopentane well, much better that a pure polystyrene. PS/ES blends retain over 65% of the initial blowing agent for 3 months, while the polystyrene specimen losses one half of its blowing agent within a week.

TABLE 8

Retention of Isopentane by PS/ES Blends at 23° C.

| Test No. | Formulation (1) | Isopentane Retention After Aging at 23° C. for the Period (days) (2) | | | | | | |
|---|---|---|---|---|---|---|---|---|
| | | 0 | 7 | 14 | 30 | 60 | 90 | 120 |
| 2.1* | PS | 2.8 | 1.4 | 1.2 | 0.9 | 0.5 | 0.4 | 0.3 |
| 2.2 | PS/ES 90/10 | 14.9 | 12.5 | 11.8 | 10.9 | 9.9 | 9.4 | 9.0 |
| 2.3 | PS/ES 80/20 | 12.9 | 11.7 | 11.2 | 10.6 | 9.8 | 9.4 | 9.1 |
| 2.4 | PS/ES 70/30 | 10.3 | 9.5 | 9.1 | 8.6 | 8.0 | 7.7 | 7.4 |
| 2.5 | PS/ES 60/40 | 10.0 | 8.7 | 8.3 | 7.6 | 7.0 | 6.6 | 6.4 |

*Not an example of this invention.
(1) PS = general purpose polystyrene having 200,000 weight average molecular weight;
ES = ethylene/styrene copolymer made with 76.9 wt. percent styrene and having 0.92 M.I.
(2) Retention of isopentane by 2 mm-thick specimens after aging for the specified period at 23° C. in parts per one hundred parts of polymer.

The ethylene-styrene copolymer prepared above was compression-molded to a disc by the same procedure as above. The disc specimen was impregnated with HCFC-141b at 60° C. for 8 days per the above procedure. Retention of the blowing agent by the specimen was monitored by periodically weighing during aging at an ambient temperature of 23° C. for 6 days. The specimen thickness was about 3 mm. As shown in Table 9, the specimen retains HCFC-141b blowing agent reasonably well.

TABLE 9

Retention of R-141b by an Ethylene/Styrene Copolymer

| | Elapsed Time (days) | | | | |
|---|---|---|---|---|---|
| | 0 | 1 | 3 | 4 | 6 |
| R-141b Retention @ 23° C. (pph) | 3.2 | 3.0 | 2.9 | 2.9 | 2.9 |

EXAMPLES 6–13

Interpolymer Preparations and Characteristics
Preparation of Interpolymers J, K, & L Polymer was prepared in a 400 gallon agitated semi-continuous batch reactor. The reaction mixture consisted of approximately 250 gallons a solvent comprising a mixture of cyclohexane (85 wt %) & isopentane (15 wt %), and styrene. Prior to addition, solvent, styrene and ethylene were purified to remove water and oxygen. The inhibitor in the styrene was also removed. Inerts were removed by purging the vessel with ethylene. The vessel was then pressure controlled to a set point with ethylene. Hydrogen was added to control molecular weight. Temperature in the vessel was controlled to set-point by varying the jacket water temperature on the vessel. Prior to polymerization, the vessel was heated to the desired run temperature and the catalyst components: Titanium: (N-1,1-dimethylethyl)dimethyl(1-(1,2,3,4,5-eta)-2,3,4,5-tetramethyl-2,4-cyclopentadien-1-yl) silanaminato))(2-)N)-dimethyl, CAS# 135072-62-7, Tris (pentafluorophenyl)boron, CAS# 001109-15-5, Modified methylalumin-oxane Type 3A, CAS# 146905-79-5, were flow controlled, on a mole ratio basis of 1/3/5 respectively, combined and added to the vessel. After starting, the polymerization was allowed to proceed with ethylene supplied to the reactor as required to maintain vessel pressure. In some cases, hydrogen was added to the headspace of the reactor to maintain a mole ratio with respect to the ethylene concentration. At the end of the run, the catalyst flow was stopped, ethylene was removed from the reactor, about 1000 ppm of Irganox™ 1010 anti-oxidant was then added to the solution and the polymer was isolated from the solution. Catalyst efficiency was generally greater than 100,000 lbs. polymer per lbs. Ti. The resulting polymers were isolated from solution by either stripping with steam in a vessel or by use of a devolatilizing extruder. In the case of the steam stripped material, additional processing was required in extruder-like equipment to reduce residual moisture and any unreacted styrene.

| Inter-polymer | Solvent loaded lbs | kg | Styrene loaded lbs | kg | Pressure Psig | kPa | Temp. °C. | Total H₂ Added Grams | Run Time Hours | Polymer in Solution Wt. % |
|---|---|---|---|---|---|---|---|---|---|---|
| (J) | 252 | 114 | 1320 | 599 | 40 | 276 | 60 | 0 | 6.5 | 18.0 |
| (K) | 839 | 381 | 661 | 300 | 105 | 724 | 60 | 53.1 | 4.8 | 11.6 |
| (L) | 1196 | 542 | 225 | 102 | 70 | 483 | 60 | 7.5 | 6.1 | 7.2 |

| Inter-polymer | Melt Index $I_2$ | Total Wt % Styrene in Polymer* | Talc Level Wt % | Isolation Method |
|---|---|---|---|---|
| (J) | 1.83 | 81.6 | <2.5 | Steam Strip |
| (K) | 2.6 | 45.5 | 0 | Extruder |
| (L) | 0.03 | 29.8 | 0 | Extruder |

*Total weight percent styrene measured via Fourier Transform Infrared (FTIR) technique.

The interpolymer and vinyl aromatic polymer characteristics were given in table 10. The unblended polymers provide the comparative experiments.

TABLE 10

Interpolymer and vinylidene aromatic polymer blend components

| | Blend Component | | | |
|---|---|---|---|---|
| | (J) | (K) | (L) | (PS)*[2] |
| Composition | | | | |
| wt. % atactic Polystyrene in Interpolymer[4] | 8.2 | 10.3 | 1 | 100 |
| wt. % Styrene[4] | 69.9 | 43.4 | 29.3 | — |
| wt. % Ethylene | 30.1 | 56.6 | 70.7 | — |
| mol. % Styrene | 40 | 17.1 | 10 | — |
| mol. % Ethylene | 60 | 82.9 | 90 | — |
| Molecular Weight | | | | |
| MFR, $I_2$ | 1.83 | 2.62 | 0.03 | — |
| $M_n \times 10^{-3}$ | 71 | 66.8 | 118.1 | — |
| $M_w/M_n$ | 2.63 | 1.89 | 2.04 | — |
| Physical Properties | | | | |
| Density. g/cc | 1.0175 | 0.9626 | 0.943 | — |
| Tm, °C. | N.D. | 49.6 | 71.3 | — |
| % Crystallinity | N.D. | 4.8 | 14.7 | — |

TABLE 10-continued

Interpolymer and vinylidene aromatic polymer blend components

| | Blend Component | | | |
|---|---|---|---|---|
| | (J) | (K) | (L) | (PS)*[2] |
| Tc, °C. | N.D. | 22.1 | 58.1 | — |
| Tg (DSC) | 24.7 | ~−12 | −17.2 | 106.3 |
| Mechanical Properties | | | | |
| Shore A | 98 | 75 | 88 | 98 |
| Tensile Modulus, MPa | 703.3 | 6.5 | 20 | 1860.3 |
| Flexural Modulus, MPa | 620.6 | 68.8 | 62.1 | 3135.8 |
| Yield Stress, MPa | 7.5 | 1.3 | 2.4 | 39.5 |
| % Strain @ Break | 248.3 | 475.3 | 377.5 | 1.6 |
| Stress @ Break, MPa | 17 | 22.6 | 34.3 | 38.8 |
| Energy @ Break, N · m | 98.2 | 102.2 | 145.5 | 1.1 |
| % Stress Relaxation (50%/10 min) | 93.5 | 38 | 30.2 | CBM[3] |
| Melt Rheology | | | | |
| η × 10⁻⁵ (0.1 rad/sec), Poise | 1.01 | 1.05 | 16.6 | 4.48 |
| η (100/0.1) | 0.14 | 0.15 | 0.16[1] | 0.018 |
| Tan δ (0.1 rad/sec) | 9.98 | 4.2 | 2.37 | 2.59 |

*Not an example of the present invention
[1]ratio of η (1.6)/η (0.1)
[2]Styron ™ 685D is a general purpose polystyrene commercially available from The Dow Chemical Company, Midland, MI.
[3]Cannot be measured.
[4]Measured by NMR technique.

Test parts and characterization data for the interpolymers and their blends were generated according to the following procedures:

Compression Molding: Samples were melted at 190° C. for 3 minutes and compression molded at 190° C. under 20,000 lb. of pressure for another 2 minutes. Subsequently, the molten materials were quenched in a press equilibrated at room temperature.

Density: The density of the samples was measured according to ASTM-D792.

Differential Scanning Calorimetry (DSC): A Dupont DSC-2920 was used to measure the thermal transition temperatures and heat of transition for the interpolymers. In order to eliminate previous thermal history, samples were first heated to 200° C. Heating and cooling curves were recorded at 10° C./min. Melting (from second heat) and crystallization temperatures were recorded from the peak temperatures of the endotherm and exotherm, respectively.

Melt Shear Rheology: Oscillatory shear rheology measurements were performed with a Rheometrics RMS-800 rheometer Rheological properties were monitored at an isothermal set temperature of 190° C. in a frequency sweep mode. In tabulated data, η is the viscosity and η(100/0.1) is the viscosity ratio of values recorded at 100/0.1 rad/sec frequencies.

Mechanical Testing: Shore A hardness was measured at 23° C. following ASTM-D240.

Flexural modulus was evaluated according to ASTM-D790.

Tensile properties of the compression molded samples were measured using an Instron 1145 tensile machine equipped with an extensiometer. ASTM-D638 samples were tested at a strain rate of 5 min$^{-1}$. The average of four tensile measurements is given. The yield stress and yield strain were recorded at the inflection point in the stress/strain curve. The Energy at break is the area under the stress/strain curve.

Tensile Stress Relaxation: Uniaxial tensile stress relaxation was evaluated using an Instron 1145 tensile machine. Compression molded film (~20 mil, 0.0508 cm., thick) with a 1" (2.54 cm) gauge length was deformed to a strain level of 50% at a strain rate of 20 min$^{-1}$. The force required to maintain 50% elongation was monitored for 10 min. The magnitude of the stress relaxation is defined as $(f_i-f_f/f_i)$ where $f_i$ is the initial force and $f_f$ is the final force.

Thermomechanical Analysis (TMA): Data were generated using a Perkin Elmer TMA 7 series instrument. Probe penetration was measured to 1 mm depth on 2 mm thick compression molded parts using a heating rate of 5° C./min and a load of 1 Newton.

EXAMPLES 6–8

Blend Preparation: Three blend compositions, examples 6, 7 and 8, were prepared from interpolymer (J) and vinyl aromatic polymer (D) above in weight ratios of (J)/(D) of 90/10, 70/30 and 50/50 with a Haake mixer equipped with a Rheomix 3000 bowl. The blend components were first dry blended and then fed into the mixer equilibrated at 190° C. Feeding and temperature equilibration took about 3 to 5 minutes. The molten material was mixed at 190° C. and 40 rpm for 10 minutes.

The characterization data for these blends and the blend components is given in table 11.

TABLE 11

| | Blend polymer or Example No. | | | | |
|---|---|---|---|---|---|
| | (J)* | (D)* | 6 | 7 | 8 |
| Blend Composition, wt. ratio (J)/(D) | 100/0 | 0/100 | 90/10 | 70/30 | 50/50 |
| Mechanical Properties | | | | | |
| Shore A hardness | 98 | 98 | 96 | 97 | 98 |
| Tensile Modulus, MPa | 703.3 | 1860.3 | 654.3 | 1202.5 | 1696.9 |
| Flexural Modulus, MPa | 620.6 | 3135.8 | N.D.** | N.D.** | N.D** |
| Yield Stress, MPa | 7.5 | 39.5 | 6.4 | 9.9 | 24.5 |
| % Strain @ Break | 248.3 | 1.6 | 230.5 | 184.3 | 12.7 |
| Stress @ Break, MPa | 17 | 38.8 | 19.4 | 17.4 | 26 |
| Energy @ Break, N · m | 98.2 | 1.1 | 114.6 | 97.4 | 11.9 |

TABLE 11-continued

| | Blend polymer or Example No. | | | | |
|---|---|---|---|---|---|
| | (J)* | (D)* | 6 | 7 | 8 |
| % Stress Relaxation (50%/10 min) | 93.5 | CBM[1] | 90.7 | 85.7 | CBM[1] |
| TMA[2], ° C. | 66 | 118 | 74 | 84 | 103 |
| Melt Rheology | | | | | |
| η × 10$^{-5}$ (0.1 rad/sec), Poise | 1.01 | 4.48 | 1.2 | 1.37 | 2.36 |
| η (100/0.1) | 0.14 | 0.018 | 0.12 | 0.088 | 0.049 |
| Tan δ (0.1 rad/sec) | 9.98 | 2.59 | 9.09 | 4.66 | 2.7 |

*Not an example of the present invention.
**Not determined.
[1]cannot be measured.
[2]Temperature to 1 mm probe depth.

Olefin-based polymers generally show poor compatibility with vinyl aromatic polymers, and hence to achieve good performance characteristics there is usually a need to provide some form of compatibilization technology. This poor compatibility is generally associated with low toughness.

Table 11, however, shows that the blend composition examples 6, 7 and 8 all have good mechanical integrity, and have not lost any strength performance as evidenced by the stress, strain and energy at break. The 50/50 composition, although showing a lower toughness than the other two compositions, is nevertheless a factor of 10 higher than the unmodified vinyl aromatic polymer.

Further, the blends retain an unexpected level of stress relaxation compared to what may be expected from the component polymers. The high temperature performance of the compositions as shown by probe penetration to 1 mm depth in a thermomechanical analysis (TMA) test was greatly improved in the blends. Example 8, containing 50 wt. percent of polystyrene shows resistance to penetration approaching that of the polystyrene.

The melt rheology data for the three blend examples 6, 7 and 8 shows that the low shear performance (0.1 rad/sec) can be manipulated by blending, with the blends having low viscosities. Low tan δ values were found at low shear rates for examples 7 and 8. This translates to higher melt elasticity and improved part forming characteristics under certain melt processing operations, compared to unmodified interpolymers.

EXAMPLES 9–11

Blend Preparation: Three blend compositions, examples 9, 10 and 11, were prepared from interpolymer (K) and vinyl aromatic polymer (D) above in weight ratios of (K)/(D) of 85/15, 70/30 and 50/50 with a Haake mixer equipped with a Rheomix 3000 bowl. The blend components were first dry blended and then fed into the mixer equilibrated at 190° C. Feeding and temperature equilibration takes about 3 to 5 minutes. The molten material was mixed at 190° C. and 40 rpm for 10 minutes.

The characterization data for these blends and the blend components is given in table 12.

TABLE 12

| | Blend Polymer or Example No. | | | | |
|---|---|---|---|---|---|
| | (K)* | (PS)* | 9 | 10 | 11 |
| Blend Composition, wt. ratio (K)/(PS) | 100/0 | 0/100 | 85/15 | 70/30 | 50/50 |
| Mechanical Properties | | | | | |
| Shore A | 75 | 98 | 76 | 89 | 97 |
| Tensile Modulus, MPa | 6.5 | 1860.3 | 13.8 | 68.9 | 661.9 |
| Flexural Modulus, MPa | 68.8 | 3135.8 | 52.4 | 111.7 | 688.8 |
| Yield Stress, MPa | 1.3 | 39.5 | 2 | 4.3 | 9.4 |
| % Strain @ Break | 475.3 | 1.6 | 481.3 | 459.4 | 4.4 |
| Stress @ Break, MPa | 22.6 | 38.8 | 20.3 | 10.3 | 9.5 |
| Energy @ Break, N · m | 102.2 | 1.1 | 89.1 | 74.4 | 1.2 |
| % Stress Relaxation (50%/10 min) | 38 | CBM[1] | 51.2 | 66.1 | CBM[1] |
| Melt Rheology | | | | | |
| $\eta \times 10^{-5}$ (0.1 rad/sec), Poise | 1.05 | 4.48 | 1.07 | 1.26 | 2.1 |
| $\eta$ (100/0.1) | 0.15 | 0.018 | 0.12 | 0.093 | 0.057 |
| Tan $\delta$ (0.1 rad/sec) | 4.2 | 2.59 | 3.43 | 3.49 | 2.91 |

*Not an example of the present invention.
[1]Cannot be measured.
[2]Not measured.

Table 12 shows that the blend composition examples 9, 10 and 11 all have good mechanical integrity, and have not lost any strength performance as evidenced by the stress, strain and energy at break compared to the individual component polymers. The 50/50 composition, although showing a lower toughness than the other two compositions, was nevertheless higher than the unmodified vinyl aromatic polymer.

Further, blends 9 and 10 show high levels of stress relaxation compared to the component interpolymer.

The melt rheology data for the three blend examples 9, 10 and 11 shows that the low shear performance (0.1 rad/sec) can be manipulated by blending, with the blends having low viscosities.

EXAMPLES 12 & 13

Blend Preparation: Two blend compositions, examples 12 and 13, were prepared from interpolymer (L) and vinyl aromatic polymer (D) above in weight ratios of (L)/(D) of 75/25 and 50/50 with a Haake mixer equipped with a Rheomix 3000 bowl. The blend components were first dry blended and then fed into the mixer equilibrated at 190° C. Feeding and temperature equilibration took about 3 to 5 minutes. The molten material was mixed at 190° C. and 40 rpm for 10 minutes.

The characterization data for these blends and the blend components is given in table 13.

TABLE 13

| | Blend polymer or Example No. | | | |
|---|---|---|---|---|
| | (L)* | (PS)* | 12 | 13 |
| Blend Composition, wt. ratio (L)/(PS) | 100/0 | 0/100 | 75/25 | 50/50 |
| Mechanical Properties | | | | |
| Shore A | 88 | 98 | 95 | 97 |
| Tensile Modulus, MPa | 20 | 1860.3 | 194.4 | 1313.5 |
| Flexural Modulus, MPa | 62.1 | 3135.8 | N.D. | N.D. |
| Yield Stress, MPa | 2.4 | 39.5 | 9.8 | 16.6 |
| % Strain @ Break | 377.5 | 1.6 | 199.8 | 20.6 |
| Stress @ Break, MPa | 34.3 | 38.8 | 14.2 | 19.5 |
| Energy @ Break, N · m | 145.5 | 1.1 | 92.6 | 16.4 |
| % Stress Relaxation (50%/10 min) | 30.2 | ND** | 46 | ND** |
| Melt Rheology | | | | |
| $\eta \times 10^{-5}$ (0.1 rad/sec), Poise | 16.6 | 4.48 | 21.1 | 11.4 |
| $\eta$ (100/0.1) | 0.16* | 0.018 | 0.012 | 0.023 |
| Tan $\delta$ (0.1 rad/sec) | 2.37 | 2.59 | 0.64 | 1.32 |

*Not an example of the present invention.
**not determined.

The examples 12 & 13 show the excellent compatibility with high olefin-containing interpolymers, via the mechanical property data. The blends show a high yield stress, and good strain at break values. Further, blend 12 retains an unexpected level of stress relaxation compared to interpolymer (L).

The blends both show low tan $\delta$ values; this translates to higher melt elasticity and improved part forming characteristics under certain melt processing operations compared to either blend component.

EXAMPLE 14

A. Preparation of Ethylene/Styrene Copolymers

Ethylene/styrene copolymers were made using (tert-butyl-amido)dimethyl(tetramethyl-eta5-cyclopentadienyl) silane dimethyltitanium (IV) catalyst and tris (pentafluorophenyl) borane cocatalyst according to the following procedure. A two liter stirred reactor was charged with about 360 g of mixed alkane solvent (Isopar-E™ available from Exxon Chemicals Inc.) and about 460 g of styrene comonomer. Hydrogen was added to the reactor by differential pressure expansion from a 75 mL addition tank. The reactor was heated to 80° C. and the reactor was saturated with ethylene at the desired pressure. Catalyst and cocatalyst were mixed in a dry box by pipeting the desired amount of 0.005 M solution of cocatalyst in toluene into a solution of a catalyst in toluene. The resulting solution was transferred to a catalyst addition tank and injected into the reactor. The polymerization was allowed to proceed with ethylene on demand. Additional charges of catalyst and cocatalyst were added to the reactor periodically. After 20 minutes the polymer solution was removed from the reactor and quenched with isopropyl alcohol. A hindered phenol antioxidant (Irganox™ 1010 available from Ciba Geigy Corp.), 100 mg, was added to the polymers. Volatiles were removed from the polymers in a reduced pressure vacuum oven at 135° C. for about 20 hrs. The ethylene and delta $H_2$ pressures employed in the preparation of the ethylene/styrene copolymer and the melt index ($I_2$) and styrene content in the resultant copolymer are provided in the following table 14.

TABLE 14

| Inter-polymer | Iso-par ™ E (g) | Styrene (g) | Hydrogen (Delta) | | Ethylene | | Run Time (min) | Run Temp (° C.) | Catalyst (μmol) |
|---|---|---|---|---|---|---|---|---|---|
| | | | psig | kPa | psig | kPa | | | |
| E/S - 1 | 365 | 465 | 6 | 41 | 150 | 1034 | 20 | 80 | 9.0 |
| E/S - 2 | 365 | 454 | 16 | 110 | 200 | 1379 | 20 | 80 | 5.0 |
| E/S - 3 | 361 | 461 | 21 | 145 | 250 | 1724 | 20 | 80 | 4.5 |

| Inter-polymer | $I_2$ | Styrene Content | | Wt. % |
|---|---|---|---|---|
| | | Mole % | Wt. % | |
| E/S - 1 | 0.37 | 17.3 | 43.7 | 1.5 |
| E/S - 2 | 0.22 | 13.9 | 37.5 | Not Detected |
| E/S - 3 | 0.10 | 10.4 | 30.1 | 1.8 |

B. Preparation of Injection Molded Samples for Testing

The components of Table 15 were compounded between 190° C. and 210° C. on a Baker Perkins MPC corotating 30 mm twin screw V30 mixer followed by a vented 38 mm single screw extruder. The polymer melt was passed through a two hole die and the polymer strands were cooled in a water bath and cut into pellets.

The resins were injected molded on a Demag D100-75 injection molder equipped with a 31 mm diameter barrel and a mold containing cavities for the specimens used in property testing.

TABLE 15

| Component Designation | COMPONENT | Wt. Percent |
|---|---|---|
| U | Polymer Modifier | 2.5 |
| R | HIPS XZ-95198.00[1] | 79.9 |
| S | TBBA[2] | 8.3 |
| S | Saytex ™ 8010[3] | 6.0 |
| T | Antimony Oxide | 3.3 |

[1]A high impact polystyrene available from The Dow Chemical Company having the following properties: melt flow rate = 3 g/10 min. @ 200° C./5 kg and an Izod impact strength of 2.2 ft-lbs/inch (12 kg-cm/cm).
[2]Tetrabromo bisphenol A.
[3]A brominated flame retardant commercially available from Albemarle.

The test results of the molded ignition resistant polystyrene (IRPS) blends are provided in the following table 16.

TABLE 16

| | E/S-1 | E/S-2 | E/S-3 | Kraton 1102[a]* |
|---|---|---|---|---|
| Instrumented Dart Impact Strength, | | | | |
| in-lbs | 50 | 65 | 40 | 50 |
| kg-cm | 58 | 75 | 46 | 58 |
| Melt Flow Rate (g/10 min @ 200° C./5 kg | 7.9 | 7.6 | 7.5 | 6 |
| Vicat Softening Temp., | | | | |
| ° F. | 202 | 203 | 202 | 203 |
| ° C. | (94.4) | (95) | (94.4) | (95) |
| Tensile | | | | |

TABLE 16-continued

| | E/S-1 | E/S-2 | E/S-3 | Kraton 1102[a]* |
|---|---|---|---|---|
| Modulus, | | | | |
| psi | 313,000 | 287,000 | 302,000 | 282,000 |
| MPa | 2,158 | 1,978 | 2,082 | 1,944 |
| Tensile Yield | | | | |
| psi | 3,980 | 3,980 | 3,970 | 3,830 |
| MPa | 27 | 27 | 27 | 26 |
| Tensile Elong. at rupture, % | 80 | 60 | 80 | 90 |
| Gardner Impact, | | | | |
| in.-lbs. | 157 | 137 | 73 | 90 |
| kg-cm | 181 | 158 | 84 | 104 |
| UL-94 Flammability Rating at 2.0 mm | V-2[b] | V-2[b] | V-2[b] | V-2[b] |

*Not an example of the present invention.
[a]A 70/30 styrene-butadiene tri-block rubber (SBS copolymer) commercially available from Shell. Kraton ™ 1102 has the following properties: melt flow rate = 12 g/10 min @ 200° C./5 kg.
[b]This numerical rating is not intended to reflect hazards presented by this or any other material under actual fire conditions.

The total energy absorbed in the Gardner impact test ranged from 73 to 157 in-lbs (84 to 181 kg-cm) for the E/S copolymers as compared to 90 in-lbs (104 kg-cm) for the SBS copolymer. This range of values indicates: (1) that the impact strength of a flame resistant HIPS can be improved by the addition of ES interpolymers; (2) that the impact strength of the ignition resistant polystyrene (IRPS) is affected by the composition of the E/S copolymer; and (3) that the impact strength of the IRPS containing interpolymers can be comparable or greater than that containing typical SBS, the impact modifiers which are currently used commercially.

What is claimed is:

1. A blend of polymeric materials comprising
   (A) from about 1 to about 99 weight percent of at least one substantially random interpolymer containing
      (1) from about 1 to about 65 mole percent of polymer units derived from
         (a) at least one vinyl or vinylidene aromatic monomer,
         (b) at least one hindered aliphatic or cycloaliphatic vinyl or vinylidene monomer selected from the group consisting of vinylcyclohexane, vinylcyclohexene and 5-ethylidene-2-norbornene, or
(c) a combination of (a) and (b), and
(2) from about 35 to about 99 mole percent of polymer units derived from ethylene and/or at least one aliphatic α-olefin having from about 3 to about 20 carbon atoms; and
(B) from about 1 to about 99 weight percent of
(1) at least one homopolymer of a vinyl or vinylidene aromatic monomer,
(2) at least one interpolymer of one or more vinyl or vinylidene aromatic monomer and one or more interpolymerizeable monomers other than ethylene and/or an aliphatic alpha olefin,
(3) at least one of (1) or (2) which additionally contains an impact modifier, or
(4) a combination of any two or more of (1), (2) or (3).
2. A blend of claim 1 wherein
(i) component (A2) contains from 2 to 12 carbon atoms;
(ii) the vinyl or vinylidene aromatic monomer(s) of component (B) is represented by the following general formula:

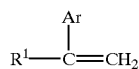

wherein $R^1$ is selected from the group of radicals consisting of hydrogen and alkyl radicals containing three carbons or less, and Ar is a phenyl group or a phenyl group substituted with from 1 to 5 substituents selected from the group consisting of halo, $C_{1-4}$-alkyl, and $C_{1-4}$-haloalkyl.

3. A blend of claim 1 wherein the interpolymerizable monomer of component (B) is selected from the group consisting of α-methyl styrene, N-phenyl maleimide, N-alkyl maleimide, acrylamide, acrylonitrile, methacrylonitrile, maleic anhydride, acrylic acid, $C_{1-4}$ alkyl acrylates and $C_{1-4}$ alkyl methacrylates.

4. A blend of claim 1 wherein component (B) is polystyrene or polystyrene containing an impact modifier.

5. A blend of claim 1 wherein component (A1a) is styrene and component (A2) is ethylene or a combination of ethylene and at least one of propylene, 4-methyl pentene, butene-1, hexene-1 or octene-1.

6. A blend of claim 1 wherein component (A1a) is styrene; component (A2) is ethylene or a combination of ethylene and at least one of propylene, 4-methyl pentene, butene-1, hexene-1 or octene-1; and component (B) is polystyrene or polystyrene containing an impact modifier.

7. A blend of claim 1 wherein component (A) is produced by polymerization in the presence of a metallocene or constrained geometry catalyst and a co-catalyst.

8. An adhesive composition containing a blend of claim 1.

9. A sheet or film resulting from calendaring, casting or blowing a blend of claim 1.

10. An article resulting from injection, compression, extrusion or blow molding a blend of claim 1.

11. A fiber, foam or latex prepared from a blend of claim 1.

12. A foamable composition comprising
(I) at least one blowing agent; and
(II) at least one interpolymer or blend of interpolymers comprising
(A) from about 1 to 99 percent by weight of at least one substantially random interpolymer comprising polymer units derived from
(1) from about 1 to about 65 mole percent of (a) at least one vinyl or vinylidene aromatic monomer,
(b) at least one hindered aliphatic or cycloaliphatic vinyl or vinylidene monomer selected from the group consisting of vinylcyclohexane, vinylcyclohexene and 5-ethylidene-2-norbornene, or (c) a combination of (a) and (b), and
(2) from about 35 to about 99 mole percent of polymer units derived from ethylene and/or at least one aliphatic α-olefin having from about 3 to about 20 carbon atoms; and
(B) from 1 to about 99 percent by weight of at least one homopolymer of a vinyl or vinylidene aromatic monomer or at least one interpolymer of one or more vinyl vinylidene aromatic monomers and one or more interpolymerizeable monomers other than ethylene and/or an aliphatic alpha olefin.

13. A foam resulting from subjecting the foamable composition of claim 12 to foaming conditions.

14. An adhesive composition containing a blend of claim 2.

15. An adhesive composition containing a blend of claim 3.

16. An adhesive composition containing a blend of claim 4.

17. An adhesive composition containing a blend of claim 5.

18. An adhesive composition containing a blend of claim 6.

19. An adhesive composition containing a blend of claim 7.

20. A sheet or film resulting from calendaring, casting or blowing a blend of claim 2.

21. A sheet or film resulting from calendaring, casting or blowing a blend of claim 3.

22. A sheet or film resulting from calendaring, casting or blowing a blend of claim 4.

23. A sheet or film resulting from calendaring, casting or blowing a blend of claim 5.

24. A sheet or film resulting from calendaring, casting or blowing a blend of claim 6.

25. A sheet or film resulting from calendaring, casting or blowing a blend of claim 7.

26. An article resulting from injection, compression, extrusion or blow molding a blend of claim 2.

27. An article resulting from injection, compression, extrusion or blow molding a blend of claim 3.

28. An article resulting from injection, compression, extrusion or blow molding a blend of claim 4.

29. An article resulting from injection, compression, extrusion or blow molding a blend of claim 5.

30. An article resulting from injection, compression, extrusion or blow molding a blend of claim 6.

31. An article resulting from injection, compression, extrusion or blow molding a blend of claim 7.

32. A fiber, foam or latex prepared from a blend of claim 2.

33. A fiber, foam or latex prepared from a blend of claim 3.

34. A fiber, foam or latex prepared from a blend of claim 4.

35. A fiber, foam or latex prepared from a blend of claim 5.

36. A fiber, foam or latex prepared from a blend of claim 6.

37. A fiber, foam or latex prepared from a blend of claim 7.

* * * * *